(12) United States Patent
Berlein et al.

(10) Patent No.: US 10,687,549 B2
(45) Date of Patent: Jun. 23, 2020

(54) APPARATUS AND METHOD FOR CRACKING STONE FRUIT NUTS

(71) Applicant: JANON TRADING (PTY) LTD., Gauteng (ZA)

(72) Inventors: Anthony Walter Berlein, White River (ZA); Geoffrey Peter Harwood, Nelspruit (ZA)

(73) Assignee: JANON TRADING PROPRIETARY LIMITED, Palm Grove, Gauteng (ZA)

( * ) Notice: Subject to any disclaimer, the term of this patent is extended or adjusted under 35 U.S.C. 154(b) by 182 days.

(21) Appl. No.: 15/556,129

(22) PCT Filed: Mar. 11, 2016

(86) PCT No.: PCT/IB2016/051392
§ 371 (c)(1),
(2) Date: Sep. 6, 2017

(87) PCT Pub. No.: WO2016/142914
PCT Pub. Date: Sep. 15, 2016

(65) Prior Publication Data
US 2018/0042288 A1    Feb. 15, 2018

(30) Foreign Application Priority Data

Mar. 11, 2015 (ZA) .................................. 2015/01130

(51) Int. Cl.
*A23N 5/00* (2006.01)
*A23L 25/00* (2016.01)

(52) U.S. Cl.
CPC ................ *A23N 5/00* (2013.01); *A23L 25/20* (2016.08); *A23V 2002/00* (2013.01)

(58) Field of Classification Search
CPC .................................... A23N 5/00; A23L 25/20
See application file for complete search history.

(56) References Cited

U.S. PATENT DOCUMENTS 2,241,737 A * 5/1941 Romberg ................ A01F 11/08
209/3
2,330,605 A * 9/1943 Meyer ...................... A23N 5/00
134/56 R
(Continued)

FOREIGN PATENT DOCUMENTS

CN        201341414 Y    11/2009
CN        101642279 A     2/2010
(Continued)

OTHER PUBLICATIONS

International Search Report for International Patent Application No. PCT/IB2016/051392, dated Jul. 1, 2016 (5 pages).
(Continued)

*Primary Examiner* — Anthony J Weier
(74) *Attorney, Agent, or Firm* — Dorsey & Whitney LLP

(57) ABSTRACT

Shown is an apparatus and method for cracking stone fruit nuts. The apparatus includes a frame (2) supporting a set of spaced apart jaw including a first jaw (4) and a second jaw (5) defining between them a gap (6), which is tapered down from the inlet (7) to the outlet (8). The first jaw (4) is adjustably secured to the frame (2) for adjustment of the size of the gap (6). The second jaw (5) is movably supported by the frame (2) and secured to drive means configured to rotatably move the second jaw (5) relative to the first jaw (4) with a tangential motion resulting in the continuously change of the size of the gap (6). To crack the shell, the stone fruit nut is located between the jaws and repeatedly pressed and rolled between the jaws from the inlet (7) to the outlet (8).

15 Claims, 6 Drawing Sheets

(56) References Cited

U.S. PATENT DOCUMENTS

| | | | | |
|---|---|---|---|---|
| 4,183,967 A | * | 1/1980 | Nelson | A23N 5/00 |
| | | | | 100/38 |
| 4,467,710 A | * | 8/1984 | Verma | A23N 5/00 |
| | | | | 99/571 |
| 4,819,331 A | * | 4/1989 | Joyama | A23N 5/00 |
| | | | | 241/240 |
| 5,361,688 A | * | 11/1994 | Blankenship | A23N 5/00 |
| | | | | 30/120.4 |
| 5,505,123 A | | 4/1996 | Kim et al. | |
| 9,138,015 B2 | * | 9/2015 | Estess | A47J 43/26 |

FOREIGN PATENT DOCUMENTS

| | | | |
|---|---|---|---|
| GB | 210036 | * | 9/1924 |
| JP | 61031071 | * | 2/1986 |
| WO | 2016142914 A1 | | 9/2016 |

OTHER PUBLICATIONS

Written Opinion of the International Searching Authority for International Patent Application No. PCT/IB2016/051392, dated Jul. 1, 2016 (5 pages).

* cited by examiner

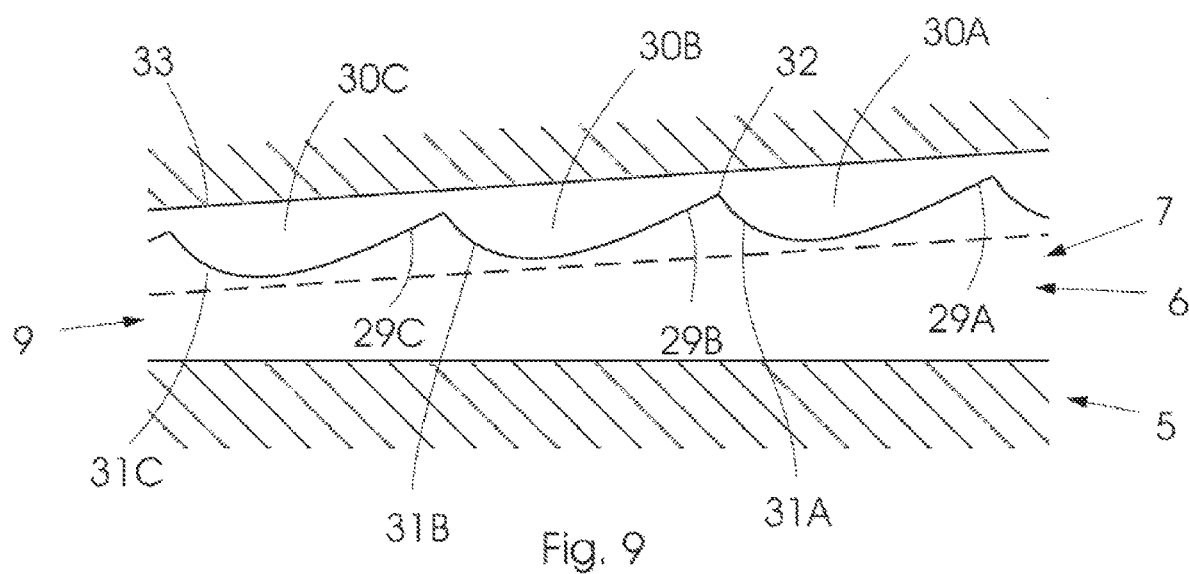

APPARATUS AND METHOD FOR CRACKING STONE FRUIT NUTS

FIELD OF THE INVENTION

This invention relates to a method for cracking stone fruit nuts, in particular pecan nuts.

BACKGROUND TO THE INVENTION

The pecan, which is a large deciduous tree (*Carya illinoinensis*) is a species of hickory native to Mexico and the south-central and southeastern regions of the United States. A pecan, like the fruit of all other members of the hickory genus, is not truly a nut, but is technically a drupe, a fruit with a single stone or pit, surrounded by a husk. The husks are produced from the exocarp tissue of the flower, while the part known as the nut develops from the endocarp and contains the seed. The husk itself is aeneous, oval to oblong, 2.6-6 cm long and 1.5-3 cm broad. The outer husk is 3-4 mm thick, starts out green and turns brown at maturity, at which time it splits off in four sections to release the thin-shelled nut.

Today, the U.S. produces between 75% and 85% of the world's pecans, with an annual crop of 180-240 thousand metric tons, in-shell basis, from more than 10 million trees. Historically, the leading pecan-producing state in the U.S. has been Georgia, followed by Texas, New Mexico, Arizona, Louisiana, and Oklahoma. Pecans are also grown in Alabama, Florida, Arkansas, Kansas, Missouri, South Carolina, and Hawaii. Outside the United States, pecans are grown in Australia, Brazil, China, Israel, Mexico, Peru, and South Africa.

The seeds (nuts) of the pecan are edible, with a rich, buttery flavor. They can be eaten fresh, dried, roasted or used in cooking, particularly in sweet desserts. One of the most common desserts with the pecan as a central ingredient is the pecan pie, a traditional Southern U.S. dish. Pecans are also a major ingredient in praline candy.

The pecan nut meat is dicotyledonous, having two halves. An unbroken nut meat is classified by the USDA (United States Department of Agriculture), as a separated half, which has not been significantly damaged. (To qualify as a half kernel, the kernel may not have more than one eighth of the kernel missing, inclusive of the joiner piece between the two halves.)

Cracking and shelling pecans and removing the edible nut meat with minimal breakage is the ultimate aim of all pecan nut processing operations. Modern mechanical shelling operations typically recover between 50%-75% unbroken nut meats. Many shelling operations in Mexico have resorted to shelling by hand in order to achieve a higher percentage of unbroken nut meats. The difference in price received between unbroken and broken nut meats is substantial and the additional indirect losses incurred from breakage include, amongst others, loss of small pieces and nut meat dust to waste, additional labour cost in sorting pieces, a higher degradation and potential for development of rancidity factor in pieces and a higher percentage contamination of pieces with shell.

Current Process of Shelling Pecan Nuts

Structure of the Pecan Nut

Pecan nuts are borne in terminal clusters of 2-10 individuals terminally on the current season's growth. The green, fleshy shuck is composed of bract and ovarian tissue (exocarp and mesocarp), and surrounds the nut (endocarp) until maturity. The shuck dehisces along 4 regular sutures. Nuts are ovoid, 25-50 mm long, containing a large embryo composed mostly of two cotyledons or kernels. The cotyledons are separated by a thin, papery central plate extending from the inner layer of the endocarp. The kernels have dorsal grooves which are filled with a packing material, which also extends from the endocarp.

The endocarp or pecan shell is composed primarily of cellulose and lignin and varies in thickness from about 0.5-2.5 mm. The central plate and dorsal groove packing material both contain high levels of tannins and are astringent and bitter to taste. It is critical to remove both these materials, prior to packaging and sale of the kernels in order that they are not eaten by consumers and to ensure that the kernels are not classified as contaminated by their inclusion.

Current Harvesting, Drying, Shucking, Cleaning and Storage Methods

When the nuts ripen on the tree in autumn, the shuck usually dries and falls off before or during harvesting. Those nuts which are harvested with the shuck still adhering go through a mechanical shucking process to remove the shucks.

The nuts (in-shell) are harvested either mechanically, or by hand, the harvested nuts are immediately dried to a less than 4% moisture content either by the sun or drying machines. The moisture content of less than 4% ensures that the nuts may be stored safely without risk of degradation due to mold attack or the like. The dried nuts are shucked, cleaned and popped (removal of empty nuts via vacuum suction over a perforated conveyor belt) and then either bagged or placed in storage bins. The dried nuts are stored either at ambient winter temperature with adequate ventilation or in cold storage facilities at 5° C. with a relative humidity of less than 65% if they are carry-over stock from the season.

Preparation of Nuts, Cracking and Shelling

In current pecan processing plants, before the nuts are cracked, they are conditioned in order to increase the moisture content of the kernels from <4% to 8%. This is done so that the kernels become less brittle and less prone to breakage. There are a number of methods of increasing moisture, including immersion in chlorinated water for a number of hours, steaming or boiling the nuts for a number of minutes and increasing the relative humidity of the air while nuts are under cold storage. Once the nuts are conditioned, they are cracked, shelled, dried to <3% moisture, cleaned, sorted and packed for market. There are known different methods of cracking, shelling, drying, cleaning and sorting.

The most critical part of processing pecan nuts is the cracking step. This involves only the step of cracking the shell itself. Once the nut has been cracked, it is passed through a shelling machine, which separates the kernels from the shells. Shelling machines are generally very efficient. Most large processors employ a cracking system whereby the nuts are individually fed into the machine via a belt to a magazine, where the nuts are impacted mechanically on each longitudinal end, similar to a belt fed machine gun.

The impacting on the longitudinal ends of the nuts is problematic since the lengths of nuts vary significantly in batches. A nut is located end to end between a base and a striker, and impacted with the striker on one end. If the nut is substantially shorter than other nuts in the batch it may not be penetrated deep enough by the striker to crack it open. If the nut is substantially longer it will be penetrated too deep with the striker which damages the kernel.

There is a general aversion to developing crackers which impact the nut on the side as this usually results in even more damage to the kernels.

The total current conventional process is summarized in the flow chart shown in FIG. 1.

Limitations on Current Cracking Methods

The major limitations of the current cracking methods include:

- The thicknesses of shells vary considerably (>400% difference) between the different cultivars. Farmers' orchards globally are often planted with mixed cultivars to assist with pollination and therefore nuts delivered for processing do not have a consistent thickness, shape, brittleness or strength, resulting in significantly varying physiological characteristics and resultant damage to the nut kernels.
- The nuts vary in length and breadth and because they are sized by breadth only, there is limited consistency in the feed and cracking, resulting in broken nut meats.
- Pecans are indigenous to the United States and there is a high percentage of nuts supplied from seedling (or native) trees. Their shells tend to be very thick and these nuts result in a very high percentage of damaged kernels during processing.
- During the conditioning process, the shell, kernel, packing material and central plate absorb moisture, causing the kernel to swell against the inside of the shell. During the cracking step the shock from any mechanical impact on the shell is conducted through to the kernel, increasing damage to the kernel.
- Contamination from adhering dorsal groove packing material remains a large problem.
- Steaming the nuts in order to both sanitize the nut and weaken the shell often results in degradation and discoloration of the kernels.

These problems are not limited to pecan nuts only, and extend also to other fruits with shelled nuts. These include, for example, walnuts and almonds.

OBJECTIVE OF THE INVENTION

It is an object of the invention to provide a method for shelling stone fruits which at least partly overcomes the abovementioned problems.

SUMMARY OF THE INVENTION

In accordance with this invention there is provided apparatus for cracking stone fruit nuts comprising a frame supporting a set of spaced apart jaws comprising a first jaw and a second jaw defining between them a gap, with the set of jaws having an inlet at a first end thereof and an outlet at a second end thereof, and with the gap being tapered down from the inlet to the outlet; the first jaw being adjustably secured to the frame for adjustment of the size of the gap; the second jaw being movably supported by the frame and secured to drive means configured to rotatably move the second jaw relative to the first jaw, operatively to continuously change the size of the gap between a predeterminable minimum size and a predeterminable maximum size; with the tangential motion of the second jaw when the gap is at its minimum size being directed substantially towards the outlet and the tangential motion of the second jaw when the gap is at its maximum size being directed substantially towards the inlet to crack the shell of a stone fruit nut located between the jaws by repeatedly pressing and rolling the nut on its side between the jaws from the inlet to the outlet.

There is further provided for the first jaw to be provided with vibratory drive means, operatively to assist in rotating a nut located between the jaws to orientate it to a position where it will roll between the set of jaws and to assist in moving cracked pieces of shell and self-shelled nut kernels to the outlet.

There is also provided for the second jaw to be rotatably movable through either a circular path or an elliptical path, and preferably for the plane within which the second jaw is located at any point in its rotation to remain parallel to any other plane in which the second jaw plane is located during its rotation.

There is further provided for the frame to include a base having a first end and a second end, with a first upright support extending from proximate the first end of the base and a second upright support extending from proximate the second end of the base, with the set of jaws being supported between the upright supports.

There is still further provided for the first end of the set of jaws to be supported by the first upright support and for the second end of the set of jaws to be supported by the second upright support, and for the first end to be located higher than the second end to provide a downward gradient for the gap.

There is further provided for each upright support to comprises a set of posts extending upward on either side of its respective end of the set of jaws, and for the first jaw to be secured to the posts by means of height adjustable brackets, operatively allowing the height of the first jaw to be adjusted relative to the frame for adjustment of the size of the gap.

There is still further provided for the second jaw is provided with a yoke extending at least part of the distance between the inlet and outlet of the set of jaws, for the yoke rotatably supporting a set of parallel spaced apart shafts which are rotatably supported by the side plates located between the uprights supports on each side of the set of jaws, each shaft including a cam that is rotatably secured within the yoke, the set of shafts being connected to the drive means to rotate the shafts, with the shafts supported for eccentric rotation within the yoke operatively for rotation of the shafts by the drive means to eccentrically rotate within the yoke to impart eccentric motion to the yoke which rotates the second jaw relative to the first jaw to continuously change the size of the gap between the predeterminable minimum size and the predeterminable maximum size.

There is further provided for the eccentricity of the shafts' rotation within the yoke to be adjustable by changing the off-centre offset of the cam of each shaft, and preferably for the off-centre offset of the cam of each shaft within the yoke to be between 0.5 mm and 6 mm, more preferably between 1 mm and 5 mm, and most preferably about 3 mm.

According to a further aspect of the invention there is provided for one of the jaws to be provided with a series of ramps extending from the operatively inner surface of the jaw towards the opposing inner surface of the other jaw, each ramp extending from a foot to a top with the top further than the foot from the inner surface of its jaw, and with the top of a ramp located proximate the foot of a next ramp in the series of ramps.

There is further provided for the top of the ramp to comprise a curved surface leading down from the top to a toe proximate the inner surface of its jaw, and preferably for the toe to be located on the inner surface of its jaw with the toe of one ramp being located adjacent the foot of a next ramp in the series of ramps.

There is still further provided for the foot of each of the ramps from the second ramp onwards to be located in abutment with the toe of the ramp preceding it in the series of ramps, alternatively for the foot of each of the ramps from the second ramp onwards to be located in abutment with the toe of the ramp preceding it in the series of ramps, and for the foot and the toe of abutting ramps to intersect each other at a plane extending further into the gap than the inner surface of its jaw, with the inner surface of the jaw being defined as a line extending between the foot of the first ramp and the toe of the last ramp in the series of ramps on the inner surface of the jaw.

According to a yet further feature of the invention there is provided for the jaws to be perforated with a perforation size smaller than the smallest of the minimum dimension of a nut to be processed by the apparatus and a kernel from such a nut, operatively to prevent nuts or self-shelled nut kernels from passing through the perforations.

According to an alternative aspect of the invention, there is provided for the jaws to be provided with substantially smooth operatively inner surfaces.

There is still further provided for the operatively inner surfaces of the jaws to be provided with abrasion resistant linings.

There is still further provided for the minimum gap size at the inlet to be greater than the maximum width and less than the minimum length of a nut to be processed by the apparatus, and preferably for the difference in size between the inlet and the outlet to be about 2 mm for the cracking of pecan nuts.

According to a further aspect of the invention, there is provided a method for cracking stone fruit nuts which includes conditioning nuts before cracking them, preferably using the apparatus as defined above, the conditioning including subjecting nuts to humidification to ensure the moisture content of the nuts by weight after conditioning is between 5% and 25%.

There is further provided for the moisture content of the nuts to more preferably be between about 8% and 20%, still more preferably between 12% and 16%, and most preferably about 15%.

There is further provided for the method to conditioning of the nuts by immersing them in water with a temperature of between 0° C. and 15° C., and preferably in water at a temperature of about 7° C.

There is also provided for the method to immersing the nuts in water for between 1 and 12 hours, more preferably between 4 and 8 hours, and most preferably for about 6 hours.

There is also provided for the method to include exchanging the water within which the nuts are immersed at least once during the immersion process, and further preferably for the water to be recycled and filtered to remove enzymes, tannins, lignin and contaminants.

There is still further provided for the conditioning to include the further step of any one or more of immersing the nuts in boiling water, subjecting the nuts to blasting with steam, spraying the nuts with water or blasting the nuts with air, before cracking the nuts.

There is further provided for the step of cracking the nuts to include subjecting the nuts to a plurality of vibratory impacts and a plurality of compression forces progressively increasing in magnitude.

According to a further feature of the invention there is provided for the method to include, prior to cracking them in apparatus as defined above, the further step of preselecting the nuts according to width to a predeterminable range with a minimum width and a maximum width, and adjusting the size of the gap in the set of jaws for the gap at the inlet to be greater than the maximum width and for the gap at the outlet to be less than the minimum width, and preferably for the size of the gap in the set of jaws for the gap at the inlet to be in the range of 1 mm to 10 mm larger than the maximum size, and the size of the gap at the outlet to be in the range of 1 mm to 6 mm smaller than the minimum size.

There is further provided for the predeterminable width ranges to include widths between 13 mm to 15.5 mm, or 15 mm to 17.5 mm, or 17 mm to 19.5 mm or 19 mm to 21.5 mm.

There is still further provided for the method to include cracking nuts in the apparatus as defined above includes for between 5 and 60 seconds, more preferably for between 10 and 45 seconds, still more preferably for between 10 and 30 seconds, and most preferably for about 15 seconds.

According to a yet further aspect of the invention there is provided a system for cracking and at least partly shelling stone fruit nuts comprising a series of apparatus as defined above with each apparatus comprising a nut cracker in the series, with the outlet of one nut cracker feeding at least partly cracked and at least partly shelled nuts and shelled kernels to the inlet of a next nut cracker in the series, with the outlet of each nut cracker in the series, not including the last nut cracker in the series, being smaller in size than the inlet of the nut cracker that its feeds to, and with the inlet of each nut cracker in the series, not including the first nut cracker in the series, being smaller than the inlet of the nut cracker preceding it in the series.

There is further provided for the system to include separation means between each set of adjacent nut crackers in the series, the separation means including pressurized air or vacuum to at least partly remove cracked nut shells and a perforated table with perforations sized to allow shelled kernels or parts of shelled kernels to drop to a collection tray underneath thereof.

There is also provided for the gradient between the inlet and outlet of each nut cracker in the series to not be the same for all the nut crackers, with the gradient of the each nut cracker in the series, not including the first nut cracker, being shallower than the gradient of the nut cracker preceding it in the series.

According to a further aspect of the invention there is provided a method of operating a system for cracking and at least partly shelling stone fruit nuts as defined above which includes performing the method as defined above and feeding the nuts into the first nut cracker in the series of nut crackers and feeding output from one nut cracker to the inlet of a next nut cracker in the series, to collect cracked and at least partly shelled nuts from the outlet of the last nut cracker in the series.

There is further provided for the method to include the step of subjecting the output from each nut cracker to operation of the separation means, and feeding remaining nuts to the inlet of a next nut cracker in the series, to collect cracked and at least partly shelled nuts from the outlet of the last nut cracker in the series

BRIEF DESCRIPTION OF THE DRAWINGS

A preferred embodiment of the invention is described by way of example only and with reference to the accompanying drawings in which:

FIG. 9 is a cross-sectional view of part of a set of jaws of a nut cracker according to the invention, showing an alternative arrangement of a series of ramps on the upper jaw.

DETAILED DESCRIPTION OF THE INVENTION

Figure 1:
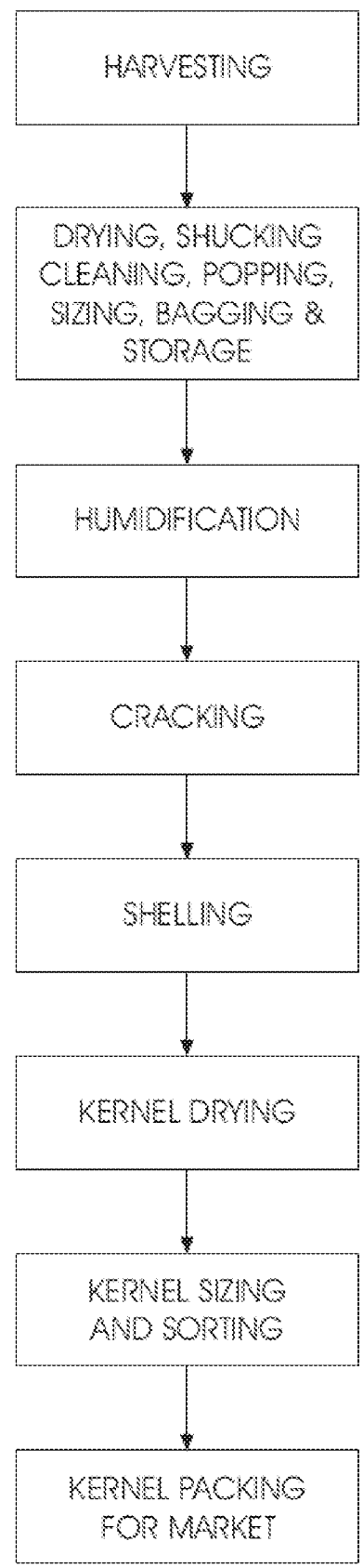
FIG. 1 is a diagram that shows the prior art method of cracking and/or shelling pecan nuts.

In a preferred embodiment of the invention a method for cracking stone fruit nuts is performed using apparatus according to the invention The apparatus is configured as a nut cracker (1), which is shown in FIGS. 3 to 7. The nut cracker (1) comprises a frame (2) that supports a set of spaced apart jaws (3), which comprises a first jaw (4) and second jaw (5) defining between them a gap (6). The first jaw (4) forms the operatively upper jaw and the second jaw (5) forms the operatively lower jaw of the set of jaws (3).

The set of jaws (3) has an inlet (7) at a first end (8) and an outlet (9) at a second end (10) thereof. The gap (6) is tapered down from the inlet (7) to the outlet (9).

The frame (2) comprises a base (11) from which uprights supports (12) extend, which supports the set of jaws (3). The upright supports (12) includes four posts (12A-12D), which includes two posts (12A, 12B) on the first end (8) of nut cracker (1) and two posts (12C, 12D) on the second end (10) of the nut cracker (1).

The set of jaws (3) is secured to the posts (12A-12D) with the first end (8) thereof located higher than the second end (10), to place the inlet (7) higher than the outlet (9).

The first (and operatively lower) jaw (5) is secured to the upright posts on its sides by means of height adjustable spacers (13). Each post (12A-12D) is provided with a spacer (12A is provided with 13A, 12B is provided with 13B, 12C is provided with 13C, and 12D is provided with 13D) which allows height adjustment at four points to the lower jaw (5). This enables the height and angle of the lower jaw (5) to be adjusted relative to the frame and thus also relative to the first (and operatively upper) jaw (4).

The two spacers (13A & 13B; 13C & 13D) on the either end (8, 10) of the frame (2) can thus be adjusted to ensure that the gap size is consistent along the width of the inlet (7) to the set of jaws (3), and consistent along the width of the outlet (9) from the set of jaws (3). In addition, the gradient between the inlet (7) and outlet (9) may be adjusted, the benefit of which will be explained in more detail further on.

The upper jaw (4) is movably secured to the frame (2) and thus also to the lower jaw (5). The nut cracker (1) is provided with a set or side plates (14A, 14B) between the posts (12A-12D).

The set of sides plates (14A, 14B) extend at their top sides above the upper jaw (4). The nut cracker (1) is provided with a set of parallel spaced apart shafts (15A, 15B) extending through and rotatably supported by the sides plates (14A, 14B). The shafts (15A, 15B) are provided on their one end, where they extend through the operatively left side plate (14A)—viewed from the inlet (7) end of the nut cracker (1) as shown in FIG. 36 in particular—with a set of pulleys (16A, 16B). A first of these (16A) is secured by means of a drive belt (17) to an electric motor (18), and the second pulley (16B) is rotatably secured to the first pulley (16A) by means of a second drive belt (19).

The two shafts (15A, 15B) are secured to each other by means of an eccentric crank (20). This contains two spaced apart bearings (22A, 22B). The crank (20) is secured to the operatively top surface of the upper jaw (4), causing the upper jaw (4) to move in concert with the crank (20).

Within each bearing (22A, 22B) a circular cam (23A, 23B) is located that is keyed to one of the two shafts (15A, 15B). Each cam has an off-centre offset of about 3 mm.

The offset may be changed to be between 0.5 mm and 6 mm by using different cams, to alter the movement of the upper jaw (4), depending on the specific type of nuts treated and the treatment conditions.

The offset of 3 mm in this embodiment of the nut cracker (1) causes rotation of each bearing (22A, 22B) about its shaft (15A, 15B) in a circle of 6 mm. The upper jaw (4) is thus rotated to describe a circular path with a diameter of 6 mm, twice the 3 mm offset of the cams (23A, 23B).

Figure 5:
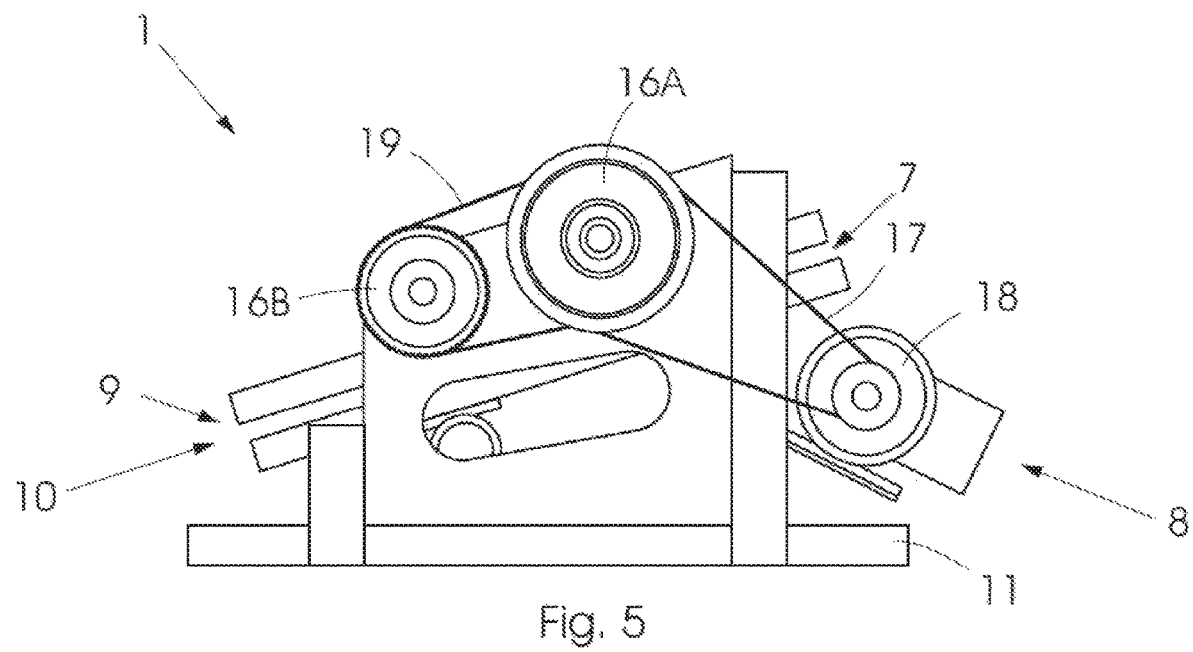
FIG. 5 is a side elevation view of the apparatus of FIG. 3.
Figure 6:
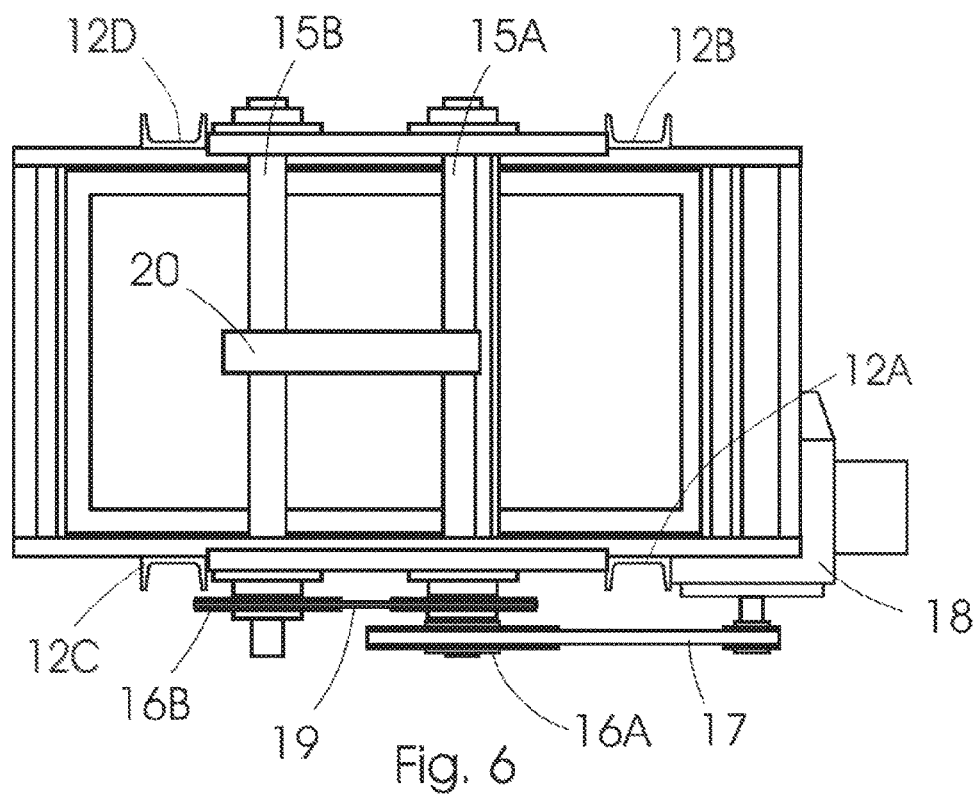
FIG. 6 is a plan view of the apparatus of FIG. 3.
Figure 7:
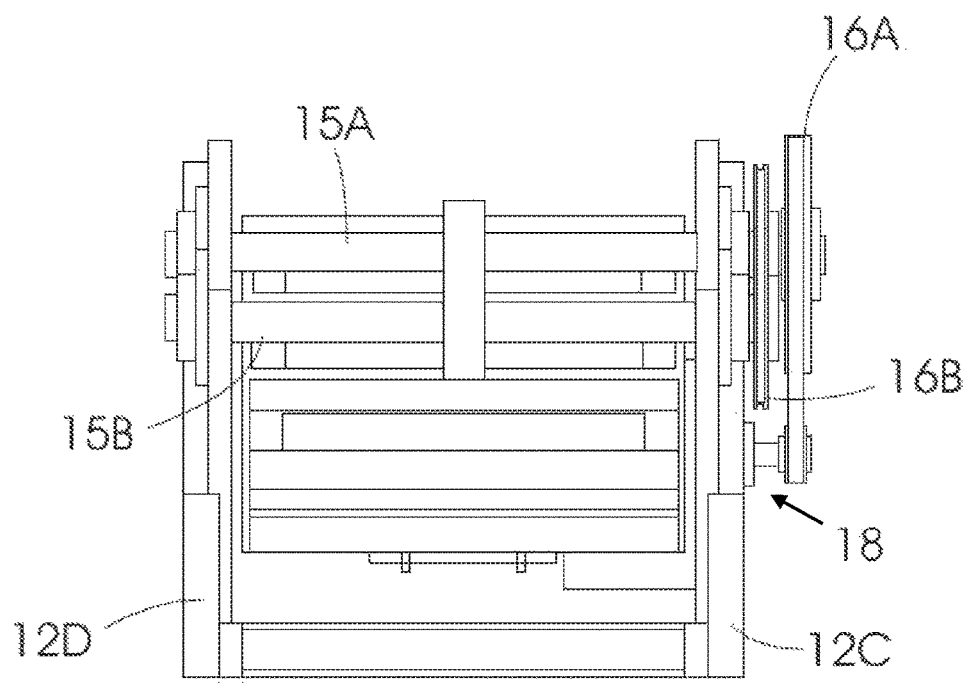
FIG. 7 is an end view from the outlet end of the apparatus of FIG. 3.

The direction of rotation of the shafts (15A, 15B) is clockwise when viewed from the drive pulley (16A, 16B) side of the nut cracker (1), as shown in FIG. 5. The upper jaw (4) is thus rotated in a manner which sees it remaining in plane parallel to any other plane in which it is located during its rotation. This ensures that no area of the upper jaw (4) closes faster or opens faster than any other area, which ensures consistent treatment of nuts in the set of jaws (3).

This direction of rotation causes the tangential motion of the upper jaw (4), when the gap (6) is at its minimum size, to be directed substantially towards the outlet (9). At the opposite side of the circle of rotation of the upper jaw (4), its tangential motion when the gap (6) is at its maximum size being directed substantially towards the inlet (7).

This allows the upper jaw (4) to be rotated to repeatedly press down and role a stone fruit nut on its side between the jaws (3) from the inlet (7) to the outlet (9).

The lower jaw (5) is provided with a vibratory motor (21) fitted to a cross member underneath it. This vibratory motor imparts an elliptical vibrating motion to the lower jaw (5) which operates in conjunction with the force from the upper jaw (4) to crack nuts within the jaws.

In addition to this rolling action the gradient of the gap (6) between the inlet (7) and outlet (9) also assists in progressing a nut through the set of jaws. The gradient of the set of jaws (3) may be adjusted to modify the retention time of nuts within the jaws (3). This may be used in conjunction with the offset of the cams (23A, 23B), and the size of the gap (6), and the degree of the taper between the jaws (4, 5) to modify the force with which the nuts are pressed and for how long they are pressed.

Figure 8:
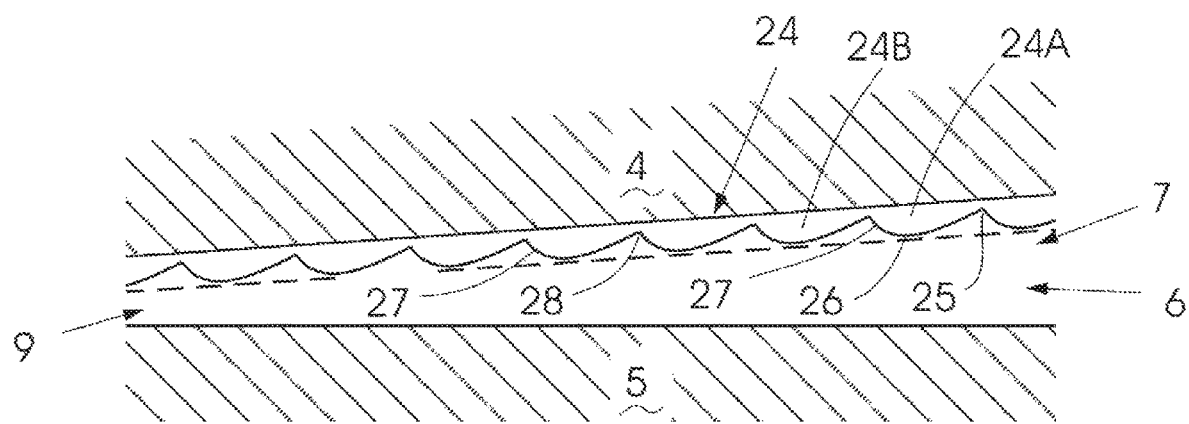
FIG. 8 is a cross-sectional view of part of a set of jaws of a nut cracker according to the invention, showing a series of ramps on the upper jaw.

A further aspect of the nut cracker (1) that assists in the cracking of the nuts is the profile of the upper jaw (4) that extends into the gap (6), as shown in FIGS. 8 and 9. As mentioned before, the gap (6) tapers down from the inlet (7) to the outlet (9). In addition to this, the upper jaw (4) is provided with a series of ramps (24), as shown in FIG. 8, extending from the operatively inner surface of the upper jaw (4) towards the opposing inner surface of the lower jaw (5). Each ramp (24) extends from a foot (25) to a top (26) with the top (26) higher than the foot (25) from the inner surface of the upper jaw (4). The top (26) of a first ramp (24A) is located proximate the foot (25B) of a next ramp (24B) in the series of ramps (24), and so forth.

Also as shown in FIG. 8, the top of each ramp comprises a curved surface (27) leading down from the top (26) to a toe (28), with the toe (28) being located substantially on the inner surface of the upper jaw (4). The toe of one ramp is located in abutment with the foot of the next ramp in the series of ramps.

As shown in FIG. 9, an alternative arrangement of this is for the foot (29B) of each of the ramps (30) from the second ramp (30B) onwards to be located in abutment with the toe (31A) of the ramp (30A) preceding it in the series of ramps (30) and for the foot (29) and the toe (31) of abutting ramps to intersect each other at a plane (32) extending further into the gap (6) from the inner surface of its jaw than is the case with the configuration shown in FIG. 8, with the inner surface of the jaw (4) being defined as a line (33) extending between the foot (29A) of the first ramp (30A) and the toe (31C) of the last ramp (30C) in the series of ramps (30) on the inner surface of the jaw (4). This effectively means that the space between the top of one ramp and the foot of the next ramp is limited which keeps more pressure on the nuts as they roll over the ramps (30).

It will be appreciated that each batch of nuts will require a certain amount of empirical setup to achieve the most suitable treatment conditions to deliver the best results for such a batch of nuts. This will include not pressing nuts too hard in any one compression to avoid damaging kernels by pressing shell fragments into the kernel. At the same time, each nut should be compressed enough times and also from enough sides to ensure that a crack is initiated and propagated around its shell to release its kernel from the shell.

This enables an operator to set up the nut cracker to treat nuts to the extent required to crack their shells sufficiently for a shelling machine, used subsequently to the nut cracker (1), to open the nuts to release their kernels undamaged in overwhelming majority of nuts treated. In many instances the nuts even self-shells still within the nut cracker (1) which means its kernel emerges free from its shell from the outlet of the nut cracker (1).

The adjustable gradient of the set of jaws (3) is also utilized when a plurality of nut crackers (1) are used in series. This is explained in more detail below.

The cracking on nuts in the nut cracker (1) also benefits from conditioning of the nuts whilst still in their shells before being fed into the nut cracker (1).

Preferably the nuts are classified into size ranges before treatment, to an optimum range for treatment in the nut cracker (1).

The conditioning of the nuts includes subjecting them to humidification to ensure the moisture content of the nuts by weight after conditioning is between 5% and 25%. More preferably the moisture content should be between about 8% and 20%, still more preferably between 12% and 16%, and most preferably about 15%.

This conditioning includes immersing the nuts in water with a temperature of between 0° C. and 15° C., and preferably in water at a temperature of about 7° C. The nuts are immersed in this water for between 1 and 12 hours, more preferably between 4 and 8 hours, and most preferably for about 6 hours.

The increase in moisture content of a whole nut also has the effect of increasing the moisture content of its kernel, which makes it more resistant to damage resulting from cracking.

During the immersion process the water is preferably exchanged at least once for fresh water, or for recycled and filtered treatment water from which enzymes, tannins, lignin and contaminants have been removed.

As a further conditioning step the shells of the nuts are heated by immersing the nuts in boiling water, subjecting the nuts to blasting with steam, spraying with water or blasting with air, before feeding them into the nut cracker (1). This has the effect of heating a nut shell which it is believed allows the shell to somewhat dry out without drying the kernel, and this allows the shell to crack outwards. In particular, the outer surface of the shell dries out more that the inner area of the shell, leading to an increase in moisture content in the shell from its outer surface to its inner surface. This moisture gradient in the shell is believed to assist in making the shell crack and splinter outwards as opposed to inwards, which also protects, at least to some extent, the kernel.

The method of using the nut cracker to crack the nuts further includes preselecting the nuts according to width to a predeterminable range with a minimum width and a maximum width, and adjusting the size of the gap in the set of jaws for the gap at the inlet to be greater than the maximum width and for the gap at the outlet to be less than the minimum width. Preferably, the size of the gap at the inlet should be in the range of 1 mm to 10 mm larger than the maximum size, and the size of the gap at the outlet should be in the range of 1 mm to 6 mm smaller than the minimum size.

The predeterminable width ranges of the nuts include widths between 13 mm to 15.5 mm, or 15 mm to 17.5 mm, or 17 mm to 19.5 mm or 19 mm to 21.5 mm.

The nuts are processed through the nut cracker (1) for between 5 and 60 seconds, more preferably for between 10 and 45 seconds, still more preferably for between 10 and 30 seconds, and most preferably for about 15 seconds. This is the retention time of the nuts within the nut cracker (1).

Several tests were conducted during the development of the method and nut cracker (1) of the invention, which illustrates different aspects of the invention.

EXAMPLE I 2 kilograms of pecan nuts in-shell of mixed cultivars, with a moisture content <4% were taken from a storage area and immersed in ambient water (at approximately 20° C.) for a period of 16 hours. The water was changed once during the immersion period in order to discard enzymes, tannins, lignin and contaminants released from the nuts.

The nuts were removed from the water and weighed and a 12% weight gain was noted, taking the total moisture content to approximately 15%. It was noted that the kernels had become very flexible and rubbery in consistency.

The nuts were vibrated at a frequency of approximately 25 vibrations/second, for 30 minutes and a vibration travel stroke of approximately 15 mm. The vibrating was done on a vibrating feeder machine, with the nuts placed between a lower and upper perforated screen. The nuts had been pre-sized with width between 19 mm-21 mm. The clearance between the two screens was 25 mm. It was noted that after approximately 15 minutes of vibration, some of the nuts cracked on the screen and the kernels were released, undamaged.

After vibrating, the nuts were removed from the vibrating feeder and cracked at certain intervals, with a small hammer. It was noted that after 1 hour, post vibration, the shells appeared to be at a weakest point and cracked very easily, some being able to be cracked between the fingers only.

EXAMPLE II 2 kilograms of pecan nuts in-shell of mixed cultivars which had been kept in a cold store for 6 months at >65% humidity were removed and analyzed. It was noted that the moisture content of the kernel was between 8% and 12%.

The nuts were sized at a width between 19-21 mm immersed in water for a period of 2 hours and then removed.

A random sample of 10 immersed nuts were taken prior to vibration and individually dropped from a height of 6 meters, onto a concrete surface. The shell of only 1 of the 10 nuts cracked. The balance of the sample was vibrated at a frequency of approximately 25 vibrations/second, for 30 minutes and a vibration travel stroke of approximately 15 mm. The vibrating was done on a vibrating feeder machine, with the nuts placed between a lower and upper perforated screen. The nuts had been pre-sized with a breadth ranging from 19 mm-21 mm. The clearance between the two screens was 25 mm. It was noted that after approximately 15 minutes of vibration, some of the nuts cracked on the screen and the kernels were released, undamaged.

After vibrating, a random sample of 10 nuts was taken and individually dropped from a height of 6 meters, onto a concrete surface. The shells of 6 of the 10 nuts subsequently cracked, an increased efficiency of 600%.

Figure 2:
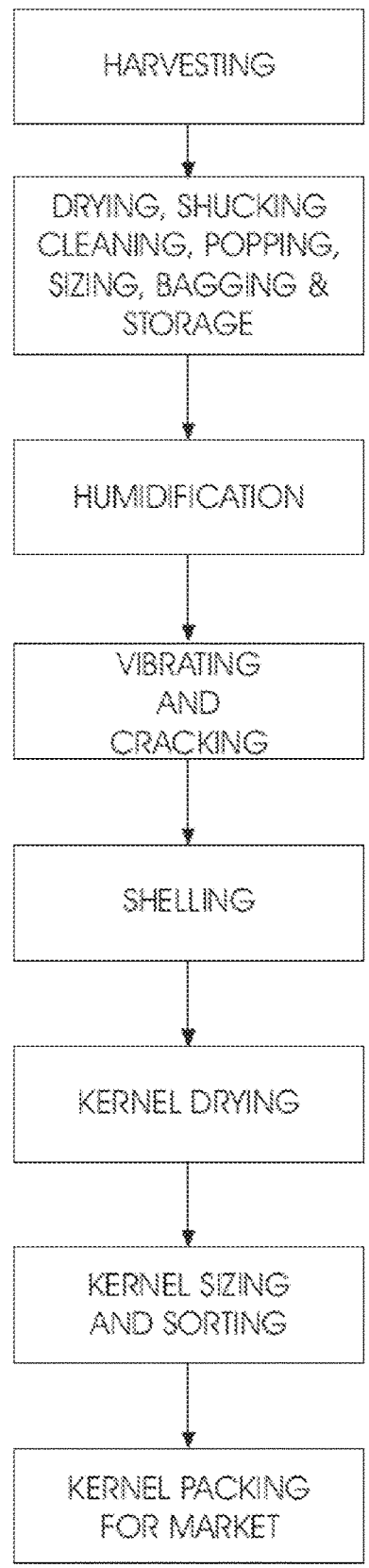
FIG. 2 is a diagram that shows the method of cracking and/or shelling pecan nuts according to the invention.
Figure 3:
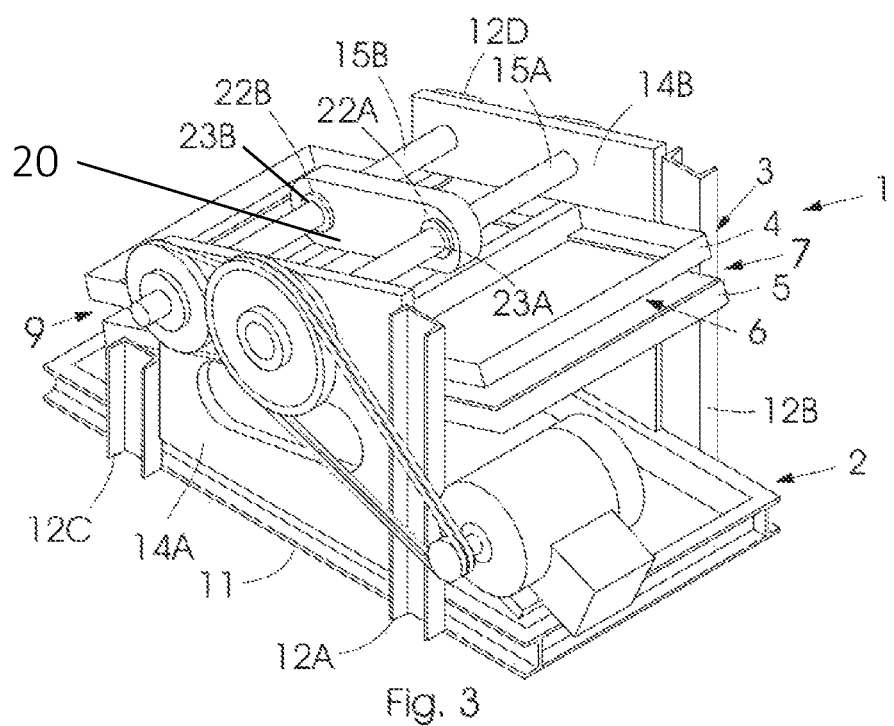
FIG. 3 is a top perspective view from the inlet end of nut cracking apparatus according to the invention.
Figure 4:
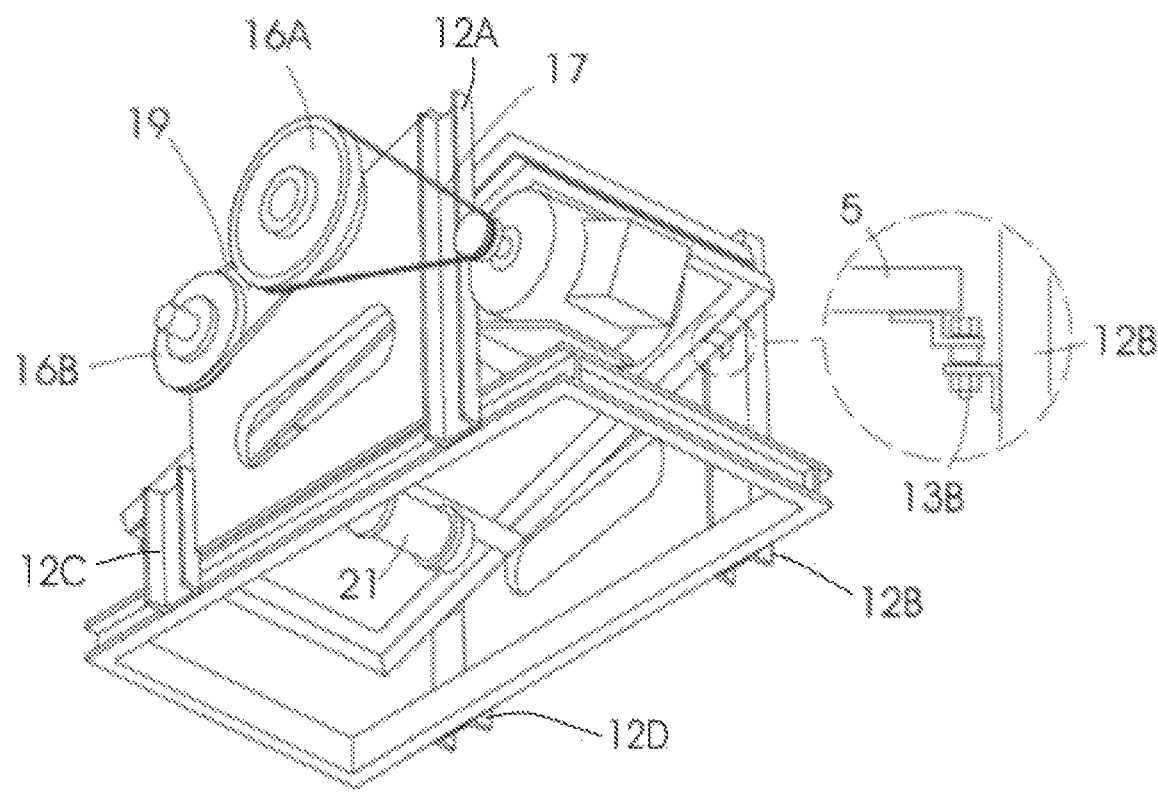
FIG. 4 is a bottom perspective view from the outlet end of the nut cracking apparatus of FIG. 3.

The total current conventional process with the addition of the novel step of vibration is summarized in the flow chart FIG. 2.

EXAMPLE III

A vibrating machine was devised where both upper and lower jaws vibrated with different actions, effectively incorporating a vibrating and cracking device into one machine. The gap between the upper and lower jaws was tapered. The inlet end gap was set at 25 mm and the outlet end gap was set at 18 mm. The travel stroke of the lower jaw was approximately 1 mm and the travel stroke of the upper jaw was approximately 5 mm.

2 kilograms of pecan nuts in-shell of mixed cultivars had been pre-sized with width between 19.05 mm-20.65 mm, which is classified as a USDA #12 size. These nuts were conditioned by firstly immersing them in water at a temperature of 10° C. for a period of 6 hours and then secondly plunged into boiling water, with a temperature of 97° C. for a period of 90 seconds.

The nuts were removed from the boiling water and after 30 seconds of resting, the nuts were fed into the vibrating machine and had a total retention time of approximately 25 seconds, before exiting the outlet end of the machine.

The best results were achieved using this method, with all of the nuts cracking and a recovery of whole intact kernel of greater than 95%.

Summary of Observations of Changes to the Pecan Nuts after Vibration

The (endocarp) shell was considerably weakened, due to the vibration, requiring much less force necessary in order to crack.

The kernels were released from the inner shell, allowing free movement within the shell, and the loose kernel is released by the expansion of the shell and/or by the vibration of the nut. This may have been caused due to the elasticity in the lignin and cellulose of the shell having been affected by the vibration.

The packing material in the dorsal grooves of the kernel had been fragmented to the extent there was no adherence to the kernel after shelling.

The shell appeared to become more brittle and continue to weaken for up to 1 hour after vibration, thereafter it appeared to become more difficult to crack possibly due to moisture loss.

It was also noted that there was some abrasion to the shell during vibration, causing further thinning and weakening.

None of the kernels were damaged after vibration and it was noted that the kernel had become very pliable, possibly also due to the vibration process.

Subsequently extensive experimentation of various apparatus configurations was conducted, to improve the invention and to optimize the results achieved by using the method and the apparatus.

It was discovered that it was possible to combine the process of vibration of the nuts after conditioning, with integrated vibrating and cracking zones into the same machine.

The major novel features incorporated into the preferred embodiment of the apparatus according to the invention are:

1. Vibration of the nuts between an upper and lower jaws, where the nuts are not intended to be in contact with both jaws, at any one instant. The specific gap between the jaws is calculated to apply the vibrations to the sides of the nuts, without them being able to receive impacts or vibrations on their ends. The design causes the nuts to bounce on their sides, making alternating contact with each jaws, without the nuts receiving any simultaneous contact from both jaws. This allows the shells to be repeatedly flexed and weakened and for the kernels to become loosened from the shell, the inner lining and the central packing membrane. In addition the dorsal packing material and the central membrane become partially severed from the shell, allowing for easier release of the kernels.
2. The second step is to create cracking zones in the machine, so that after the above period of bouncing between two jaws, the nuts start coming into contact with both jaw surfaces simultaneously and are thereafter progressively squeezed and/or tapped and deformed by the vibrations, until the shells crack.
3. The general gap between the vibrating jaws is designed to taper from the inlet end towards the outlet end, so as to apply more and more pressure and stress on the nut shells, to ensure that they crack. This is essential since not all nuts in a size range will have the exact same diameter dimensions, so some will develop cracks earlier in their passage through the apparatus, while others will only develop cracks later where the available or relative space is less.
4. Nuts which crack earlier in the apparatus's process, are not as rigid as un-cracked nuts and these can pass through the smaller confines of the narrower end without damage to the kernels. The continued application of vibratory loads to the cracked nuts, assists with initiating or further compounding of circumferential cracks around the entire nut shell, because the nuts roll through the apparatus, exposing different side aspects to the vibratory loadings.
5. The surface shape of the upper jaw (the series of ramps) has been formed so that it varies in profile along its length to provide for several repetitions of bouncing action zones and an equal number of squeezing or tapping action zones. This is preferable as it allows misshaped nuts with predominantly flat sides, to change position in the bouncing zones and prevent them from receiving the squeezing or tapping vibration loads only on one side facet.
6. The general longitudinal slope or gradient of the jaws is downwards, to allow gravity to propel the nuts through the nut cracker. The gradient is adjustable to regulate the speed of passage of nuts through the nut cracker and to provide a measure of control over the rate at which nuts can, or should be passed through it.
7. The vibratory action of the upper plate jaw is generated by an electric motor which drives shafts onto which are fitted off-centre, circular cams. The cams rotate inside bearings attached to the upper plate, causing the upper plate to perform a circular motion in a vertical plane. This circular action delivers a squeezing or tapping force onto the nut shells between the two plates and simultaneously provides a rolling pressure on the nut. This action not only causes cracks to develop in the nut shell, but also causes any crack in the nut shell, to extend and develop around the circumference of the nut.
8. The bottom jaw which is a flat planar surface is provided with direct attachment to a vibratory electric motor, which provides a narrow elliptical motion to this plate. This motion is designed to provide bouncing of the nuts and propulsion of the nut components through the nut cracker. These vibrations in the lower jaw importantly also simultaneously provide additional vibration forces to be applied to the nuts while they are in contact with both upper and lower surfaces and being squeezed by the upper jaw. By altering the frequency of the lower jaw's vibration to be between 3 and 4 times the frequency of the upper jaw, it is possible to generate varying flexural stresses in the nut shell while it is being squeezed or tapped and rolled, facilitating it to develop cracks.
9. The upper jaw and its attached components are separately mounted onto the base of the nut cracker to provide a constant motion. The lower jaw is also separately mounted onto the machine base, with allowance being made for vertical adjusters to allow the lower jaw to be moved closer to, or further away from, the upper jaw. This will allow the gap between the jaws to be adjusted to suit the size of the nuts being processed. The lower jaw is to be fitted with edge strips on its sides to prevent nuts from being ejected out of the sides of the apparatus.

ALTERNATIVE EMBODIMENTS OF THE DESIGN OF THE APPARATUS

A. In another embodiment of the machine, the position of the jaws can be inverted, so that the profiled plate surface is underneath the flat planar jaw above. The vibratory actions of the upper jaw mechanism and the lower jaw mechanism can be retained as they were before switching the jaw surfaces.

B. In a further embodiment of the machine, it is possible to reverse the entire mechanism, so that the profiled jaw is on the underside of the flat planar jaw, but the vibratory mechanism of the lower jaw is now driven by off-centre cams fitted to drive shafts, while the upper flat planar jaw is vibrated by a vibratory motor attached directly to the upper jaw.

GENERAL NOTES

Use of the method according to the invention allows for the shell to be significantly weakened, loosening and releasing the kernel, fragmenting of the shell lining and packing material and increasing the elasticity of kernel of the pecan nut prior to cracking and shelling and thus reducing the impact required to crack the nuts, therefore reducing possible damage to the kernel. The cracking of the shells is also facilitated by the integration of the cracker with the vibrator, causing progressive squeezing of the shells under double unsynchronized vibration, allowing for gentle cracking and more complete circumferential cracks to develop, which will facilitate the release of full undamaged kernels in the shelling machine.

It will be appreciated that the embodiments of the method and examples described above are not intended to limit the scope of the invention. It is possible to alter aspects thereof without departing from the essence of the invention.

It is envisaged that for each type of nut there are a number of combinations of factors, which combined correctly, will yield the optimal result. This will be clarified with empirical tests and further experimentation. It is currently envisaged by the inventor, that a greater than 95% undamaged kernel recovery is achievable in respect of pecan nuts, after optimizing this method.

The invention claimed is:

1. An apparatus for cracking stone fruit nuts, the apparatus comprising:
   a frame supporting a set of spaced apart jaws;
   wherein the set of spaced apart jaws includes a first jaw and a second jaw defining a gap therebetween;
   wherein the set of spaced apart jaws includes an inlet at a first end thereof and an outlet at a second end thereof, and with the gap tapered down from the inlet to the outlet;
   wherein the first jaw is adjustably secured to the frame for adjustment of a size of the gap;
   wherein the second jaw is movably supported by the frame and secured to drive means configured to rotatably move the second jaw relative to the first jaw, operatively to continuously change a size of the gap between a predeterminable minimum size and a predeterminable maximum size;
   wherein any plane within which the second jaw is located at any point in a rotation thereof is parallel to any other plane in which the second jaw plane is located during a rotation thereof and with a tangential motion of the second jaw when the gap is at the minimum size is directed substantially towards the outlet and the tangential motion of the second jaw when the gap is at the maximum size is directed substantially towards the inlet to crack a shell of a stone fruit nut located between the set of spaced apart jaws by repeatedly pressing and rolling the nut on a side thereof between the set of spaced apart jaws from the inlet to the outlet.

2. The apparatus of claim 1 wherein:
   the first jaw is provided with vibratory drive means, operatively to assist in rotating a nut located between the set of spaced apart jaws to orientate the nut to a position where the nut will roll between the set of spaced apart jaws and to assist in moving cracked pieces of shell and self-shelled nut kernels to the outlet; and
   the second jaw is rotatably movable through either a circular path or an elliptical path.

3. The apparatus of claim 1 wherein the frame includes:
   a base having a first end and a second end;
   a first upright support extending from proximate the first end of the base;

a second upright support extending from proximate the second end of the base, wherein the set of spaced apart jaws is supported between the upright supports, with the first end of the set of spaced apart jaws being supported by the first upright support and the second end of the set of spaced apart jaws supported by the second upright support, and wherein the first end located higher than the second end to provide a downward gradient for the gap.

4. The apparatus of claim 3 wherein:

each of the first and second upright supports includes a set of posts extending upward on either side of a respective end of the set of spaced apart jaws, wherein the first jaw is secured to the posts by means of height adjustable brackets, operatively allowing a height of the first jaw to be adjusted relative to the frame for adjustment of the size of the gap.

5. The apparatus of claim 4 wherein the second jaw includes a yoke extending at least part of a distance between the inlet and outlet of the set of spaced apart jaws, the yoke rotatably supporting a set of parallel spaced apart shafts that are rotatably supported by side plates located between the uprights supports on each side of the set of spaced apart jaws, each shaft including a cam that is rotatably secured within the yoke, the set of shafts connected to the drive means to rotate the shafts, with the shafts supported for eccentric rotation within the yoke operatively for rotation of the shafts by the drive means to eccentrically rotate within the yoke to impart eccentric motion to the yoke which rotates the second jaw relative to the first jaw to continuously change the size of the gap between the predeterminable minimum size and the predeterminable maximum size.

6. The apparatus of claim 5 wherein the eccentricity of the rotation of the shaft within the yoke is adjustable by changing the off-center offset of the cam of each shaft, with the off-center offset of the cam within the yoke being between 0.5 mm and 6 mm.

7. The apparatus of claim 6 wherein one of the first and second jaws includes a series of ramps extending from the operatively inner surface of the jaw towards the opposing inner surface of the other jaw, each ramp of the series of ramps extending from a foot to a top with the top further than the foot from the inner surface of the jaw thereof, and with the top of a ramp located proximate the foot of a next ramp in the series of ramps.

8. The apparatus of claim 7 wherein the top of the ramp includes a curved surface leading down from the top to a toe proximate the inner surface of the jaw thereof, with the toe being located on the inner surface of the jaw thereof, and with the toe of one ramp being located adjacent the foot of a next ramp in the series of ramps, and further with the foot of each of the ramps from the second ramp onwards being located in abutment with the toe of the ramp preceding it in the series of ramps.

9. The apparatus of claim 8 wherein the foot of each of the ramps from the second ramp onwards is located in abutment with the toe of the ramp preceding it in the series of ramps, and the foot and the toe of abutting ramps intersect each other at a plane extending further into the gap than the inner surface of the jaw thereof, with the inner surface of the jaw being defined as a line extending between the foot of the first ramp and the toe of the last ramp in the series of ramps on the inner surface of the jaw.

10. The apparatus of claim 1 wherein the second jaw is perforated with a perforation size smaller than the smallest of the minimum dimension of a nut to be processed by the apparatus and a kernel from such a nut, operatively to prevent nuts or self-shelled nut kernels from passing through the perforations, and for the first and second jaws being provided with substantially smooth operatively inner surfaces, and with the operatively inner surfaces of the first and second jaws being provided with abrasion resistant linings.

11. The apparatus of claim 1 wherein the minimum gap size at the inlet is greater than the maximum width and less than the minimum length of a nut to be processed by the apparatus, and with the difference in size between the inlet and the outlet being about 2 mm for the cracking of pecan nuts.

12. A method for cracking stone fruit nuts, the method comprising:

conditioning nuts before cracking the nuts;

wherein the conditioning includes subjecting the nuts to humidification to ensure the moisture content of the nuts by weight after conditioning is between 5% and 25%; and after conditioning the nuts, cracking the nuts by subjecting the nuts to a plurality of vibratory impacts and a plurality of compression forces progressively increasing in magnitude.

13. The method of claim 12 wherein the conditioning includes immersing the nuts in water with a temperature of between 0° C. and 15° C., for between 1 and 12 hours, and exchanging the water within which the nuts are immersed at least once during the immersion process, and includes recycling and filtering of the water to remove enzymes, tannins, lignin and contaminants.

14. A system for cracking and at least partly shelling stone fruit nuts comprising a series of the apparatus of claim 1, each such apparatus comprising a nut cracker in the series, with the outlet of one nut cracker feeding at least partly cracked and at least partly shelled nuts and shelled kernels to the inlet of a next nut cracker in the series, with the outlet of each nut cracker in the series, not including the last nut cracker in the series, being smaller in size than the inlet of the nut cracker that its feeds to, and with the inlet of each nut cracker in the series, not including the first nut cracker in the series, being smaller than the inlet of the nut cracker preceding it in the series.

15. The system of claim 13, further comprising separation means between each set of adjacent nut crackers in the series, the separation means including pressurized air or vacuum to at least partly remove cracked nut shells, and a perforated table with perforations sized to allow shelled kernels or parts of shelled kernels to drop to a collection tray underneath thereof, and wherein the gradient between the inlet and outlet of each nut cracker in the series is not the same for all the nut crackers, with the gradient of the each nut cracker in the series, not including the first nut cracker, being shallower than the gradient of the nut cracker preceding it in the series.

* * * * *